United States Patent
von der Weid et al.

(10) Patent No.: US 9,410,866 B2
(45) Date of Patent: Aug. 9, 2016

(54) DEVICE FOR MONITORING AN OPTICAL FIBRE

(75) Inventors: Jean Pierre von der Weid, Rio de Janeiro (BR); Giancarlo Vilela de Faria, Rio de Janeiro (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/424,102

(22) PCT Filed: Aug. 29, 2012

(86) PCT No.: PCT/SE2012/050919
§ 371 (c)(1),
(2), (4) Date: Feb. 26, 2015

(87) PCT Pub. No.: WO2014/035303
PCT Pub. Date: Mar. 6, 2014

(65) Prior Publication Data
US 2015/0241302 A1    Aug. 27, 2015

(51) Int. Cl.
*G01M 11/00* (2006.01)
*H04B 10/071* (2013.01)
*H04B 10/291* (2013.01)

(52) U.S. Cl.
CPC ...... *G01M 11/3145* (2013.01); *G01M 11/3154* (2013.01); *H04B 10/071* (2013.01); *H04B 10/291* (2013.01)

(58) Field of Classification Search
None
See application file for complete search history.

(56) References Cited

U.S. PATENT DOCUMENTS

| 5,778,117 | A | 7/1998 | Inoue |
| 6,472,655 | B1 | 10/2002 | Sakuyama |
| 6,542,287 | B1 * | 4/2003 | Ye ........................ H04B 10/296 359/334 |
| 6,556,340 | B1 * | 4/2003 | Wysocki ............... H04B 10/291 359/334 |
| 6,599,039 | B1 * | 7/2003 | Nakazato .............. H04B 10/077 398/25 |
| 6,687,049 | B1 * | 2/2004 | Sulhoff ............... H01S 3/06754 359/341.32 |
| 7,369,219 | B2 | 5/2008 | Rosolem |
| 8,934,168 | B2 | 1/2015 | He |
| 2005/0174563 | A1 | 8/2005 | Evans |
| 2007/0292130 | A1 * | 12/2007 | Pegg .................... H04B 10/071 398/20 |
| 2011/0001959 | A1 * | 1/2011 | Hasegawa ......... G01M 11/3172 356/73.1 |
| 2015/0023658 | A1 * | 1/2015 | Vilela De Faria .... H04B 10/071 398/21 |
| 2015/0253217 | A1 * | 9/2015 | Gurusami ......... G01M 11/3127 356/73.1 |
| 2016/0013611 | A1 * | 1/2016 | von der Weid ...... H01S 3/10061 359/333 |

FOREIGN PATENT DOCUMENTS

| EP | 0467080 A1 | 1/1992 |
| EP | 1564913 A2 | 8/2005 |
| EP | 2472744 A1 | 7/2012 |
| GB | 2234129 A | 1/1991 |
| WO | 96/31023 A1 | 10/1996 |
| WO | 9723964 A1 | 7/1997 |

* cited by examiner

*Primary Examiner* — Gordon J Stock, Jr.

(57) ABSTRACT

The present invention relates to a device for monitoring an optical fiber comprising a photo-sensitive device arranged to produce an electric pulse from an optical pulse injected at a first node of the optical fiber, a delay element and a first optical circulator arranged to delay the optical pulse injected at the first node of the optical fiber. Further, the device comprises an optical amplifier arrangement arranged to receive the optical pulse at its input and the produced electric pulse as an operating signal, for producing an amplified optical pulse. Moreover, the device comprises a second optical circulator arranged to receive the amplified optical pulse at a first port and output the amplified optical pulse at a second port connected to a second node of the optical fiber, and to receive an optical signal reflected back from the optical fiber at the second port and outputting the reflected optical signal at a third port.

14 Claims, 8 Drawing Sheets

DEVICE FOR MONITORING AN OPTICAL FIBRE

This application is a 371 of international application PCT/SE2012/050919, filed Aug. 29, 2012, the disclosure of which is fully incorporated herein by reference.

TECHNICAL FIELD

The invention relates to a device for monitoring an optical fibre.

BACKGROUND

A growing demand for video/data from the Internet and other networks increases the demand for high-speed data transport in transmission and delivery systems, especially at what is known as "the last mile". Telecommunications operators are deploying a large number of fibre links in order to provide broadband access to the end user based on Passive Optical Networks (PONs). With the increasing number of fibres and cables, the probability of fault at some point of the PON also increases, generating a demand for fibre inspection.

In order to ensure operation that satisfies requirements setup by standards organisations and governments, the specifications relating to monitoring of these deployed networks are generally stricter than traditional supervision or monitoring systems. This is balanced against operational expenses, which requires operators to provide relatively inexpensive solutions to monitor their networks.

For PONs, the technical requirements with respect to e.g. resolution are stricter as compared to traditional monitoring systems based on Optical Time Domain Reflectometry (OTDR) in order to localise faults with reasonable accuracy, and enough dynamic range must be accomplished to monitor split ratios up to 1:128 that could be used in remote nodes located on distances up to 60 km away.

The use of standard OTDRs without auxiliary devices has been ineffective in locating and measuring the fails and/or losses of optical fibres with adequate accuracy.

Prior art technologies have been suggested in order to improve the accuracy of fault localization and loss measurements in fibre links, as well as to increase the dynamic range of the measurement devices. In one of these technologies, a remote amplification system is used which is referred to as an extender box. The extender box can be used for data and monitoring signals. However, a problem with proposed extender boxes is their lack of interaction with commercially available OTDR devices. Generally, commercial OTDR devices are configured with internal software executing complex algorithms to improve their dynamic range. For example, these algorithms commonly perform subtraction of the background signal to characterize the optical fibre to be monitored. However, if continuous light is spread from the extender box through the fibre link, as it is the case for amplified spontaneous emission (ASE) signals appearing in optical amplifiers comprised in the extender box, software failure may occur causing measurement errors or even aborted measurement and, in some cases, permanent damage to the OTDR device.

SUMMARY

An object of the present invention is to solve or at least mitigate these problems in the art and provide an improved device for monitoring an optical fibre.

This object is attained in an aspect of the present invention by a device for monitoring an optical fibre. The device comprises a photo-sensitive device arranged to produce an electric pulse from an optical pulse injected at a first node of the optical fibre, a delay element and a first optical circulator arranged to delay the optical pulse injected at the first node of the optical fibre, wherein the optical pulse is input to a second port of the first optical circulator and output at a third port of the first optical circulator. Further, the device comprises an optical amplifier arrangement arranged to receive the optical pulse at its input and the produced electric pulse as an operating signal, wherein the delay element is arranged to delay the optical pulse such that the delayed optical pulse is synchronized with the produced electric pulse supplied to the optical amplifier arrangement as an operating signal, for producing an amplified optical pulse. Moreover, the device comprises a second optical circulator arranged to receive the amplified optical pulse at a first port and output the amplified optical pulse at a second port connected to a second node of the optical fibre. The second optical circulator is further arranged to receive an optical signal reflected back from the optical fibre at the second port and outputting the reflected optical signal at a third port via a path bypassing the optical amplifier arrangement to a first port of the first optical circulator, wherein the reflected optical signal is output from the second port of the first circulator to the first node of the optical fibre.

The synchronization advantageously causes the delayed optical pulse to overlap the produced electric pulse. The delay element can be arranged such that the delayed optical pulse exactly overlaps the produced electric pulse, thereby causing the delayed optical pulse and the produced electric pulse to be in perfect alignment. Thus, only OTDR signals injected at the first node of the optical fibre to be monitored will be amplified. Thereby, ASE signals can be avoided during time periods when there are no optical pulses injected at the first node of the optical fibre, which in the art have been known to cause failures and errors when ODTR measurements are performed. Further, by means of amplifying (only) the OTDR signals, dynamic range and hence resolution is improved.

In an embodiment of the present invention, an optical amplifier comprised in the optical amplifier arrangement is arranged to be pumped by an external optical fibre. Advantageously, the optical amplifier of the device can thus be pumped from a remote location instead of being pumped locally at the device, which requires powering.

In a further embodiment of the present invention, the device further comprises a photovoltaic cell arranged to produce an electric signal from an optical signal supplied via a powering optical fibre, and a rechargeable battery arranged to be charged by the electric signal supplied by the photovoltaic cell for powering the device. Advantageously, since the device may be located in the field where possibilities of providing local power supply are scarce, this particular embodiment facilitates transport of power to the device from a remote supply.

Further embodiments of the present invention will be discussed in the following with reference made to appended drawings.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In a hierarchical mobile telecommunications network, the network backhaul portion comprises the intermediate links between the core network of the mobile telecommunications network and the small sub-networks at the peripheral of the entire hierarchical network. For example, while user equipment communicating with a base station constitute a local sub-network, the connection between the base station and the rest of the world begins with a backhaul link to the core of the telecommunication supplier's network. A variety of different passive optical networks (PONs) can be used as mobile backhauls. For instance, optical networks such as gigabit-passive optical networks (GPONs), which provide multiple access methods, are suitable mobile backhaul solutions referred to as GPON Radio Access Networks (GPON RAN). However, other PON solutions are possible, such as e.g. Ethernet PON (EPON) or Wavelength Division Multiplexing PON (WDM-PON). In the following, GPON will be used to exemplify the xPON networks.

Figure 1:
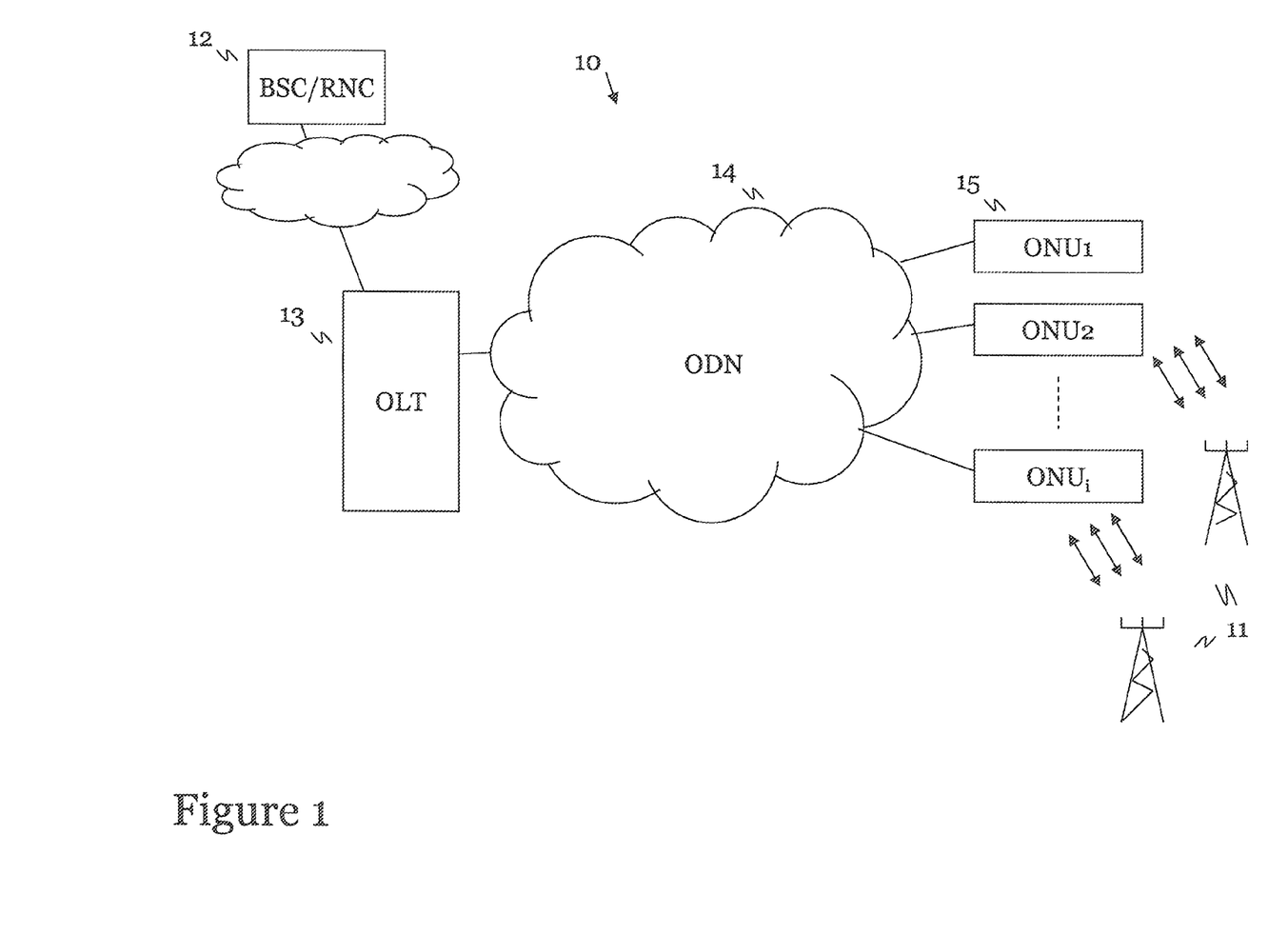
FIG. 1 illustrates a prior art gigabit-passive optical network (GPON) in which the present invention may be applied.

A GPON is a fiber-based access technology illustrated in FIG. 1, where an optical network 10 essentially transports traffic between base stations ii and a base station controller 12. A plurality of user nodes 15 in the form of optical network units (ONU)/optical network terminals (ONT) provide telecom services to end users via customer-premises equipment (CPE), which generally refers to devices such as telephones, routers, switches, set-top boxes, etc. The ONUs are connected to a central office (CO) node 13 in the form of an optical line terminal (OLT), via an optical distribution network 14 (ODN), where the plurality of (up to 64) ONUs share a common splitter and a trunk fiber connected to the OLT. The OLT serves as access multiplexer aggregating traffic from ONUs and distributing traffic towards ONUs. Thus, at the one end of the network, the OLT provides the interface between the GPON and the service provider's network services including e.g. IP traffic such as Ethernet and time division multiplexed (TDM) interfaces such as SONET. At the other end of the network, the ONUs provide the interface between the GPON and the end users, where services include e.g. voice in the form of plain old telephone service (POTS) or voice over IP (VoIP), data such as Ethernet, video, etc.

Figure 2:
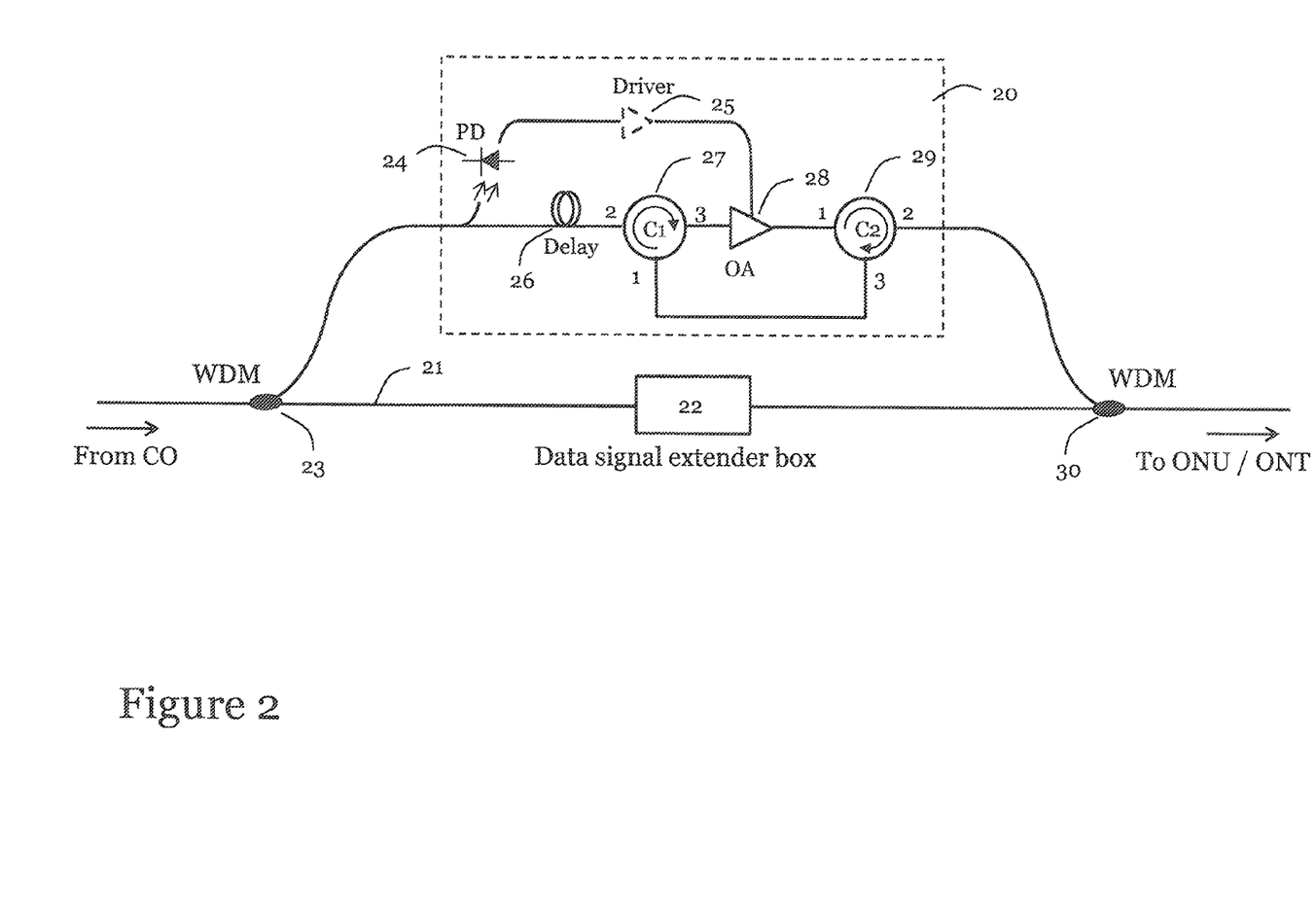
FIG. 2 shows a device for monitoring an optical fibre according to an embodiment of the present invention, where the optical amplifier arrangement comprises an optical amplifier only.

FIG. 2 shows an embodiment of a device 20 for monitoring an optical fibre 21 according to the present invention. With reference to the optical network previously discussed in FIG. 1, the optical fibre 21 typically originates at a central office (CO) in the form of an optical line terminal (OLT). The OLT typically uses wavelength-division multiplexing (WDM) technology, where a plurality of optical carrier signals are multiplexed onto a single optical fibre by using different wavelengths of laser light for enabling increased capacity as well as bidirectional communication the fibre. As can be seen in FIG. 2, data signals transported on the optical fibre 21 extending from the CO to one or more optical network units (ONU) may be amplified by a so called extender box 22 containing amplifier or repeater components. The device 20 for monitoring an optical fibre according to the various embodiments of the present invention set forth herein is typically located close to the previously mentioned common splitter in the optical distribution network (ODN), which splitter is shared by the plurality of ONUs.

The present invention is advantageously used for performing optical time-domain reflectometer (OTDR) measurements in order to characterize the optical fibre 21. When undertaking ODTR measurements, optical pulses are inserted into the optical fibre to be monitored, and light reflected back from points along the fibre are measured at the point where the pulses are inserted. By analysing the reflected pulses, status of the optical fibre 21 with respect to e.g. faults or breaks of the fibre can be determined. Thus, OTDR signals (i.e. optical pulses) to be transmitted to the device 20 for monitoring the optical fibre are separated from "ordinary" data signals to be transmitted to the ONUs at a first node 23 of the optical fibre. As can be seen, the device 20 according to embodiments of the present invention is connected in parallel to the data signal extender box 22, thus bypassing the extender box.

A photo-sensitive device 24, such as a photodetector, detects part of the optical pulse injected at the first node 23 and produces a corresponding electric pulse at its output. Optionally, a driver circuit 25 may be used to amplify and/or adequately format the electric pulse output from the photodetector 24. Further, a delay element 26 is arranged to delay the optical pulse injected at the first node 23 of the optical fibre 21. Subsequently, the delayed optical pulse is input to a second port of a first optical circulator 27 and output at a third port of the first optical circulator 27. The delay element 26 may be implemented by means of an additional optical fibre inserted at the second port side of the first optical circulator 27. Alternatively, an air guided optical path with multiple mirrors could be used to delay an optical pulse.

The device 20 further comprises an optical amplifier arrangement in the form of an optical amplifier 28 arranged to receive the delayed optical pulse at its input and the electric pulse produced by the photodetector 24 as an operating signal. The delay element 26 is arranged such that the delayed optical pulse supplied to the optical amplifier 28 is synchronized with the produced electric pulse supplied to the optical amplifier 28 from the photodetector 24 as an operating signal for producing an amplified optical pulse. The synchronization is required since the time of travel of the produced electric pulse is different from, and may be substantially greater than, that of the optical pulse passing through the first circulator 27, mainly due to the optic-electric conversion at the photodetector 24. Thus, with the synchronization, the delayed optical pulse overlaps the produced electric pulse. The delay element 26 can be arranged such that the delayed optical pulse exactly overlaps the produced electric pulse, thereby causing the delayed optical pulse and the produced electric pulse to be in alignment. In this particular embodiment, the operating signal is a drive signal of the optical amplifier 28, i.e. the amplifier will only amplify a signal at its input as long as the drive signal is applied. Thus, with this synchronization of the delayed optical pulse and the produced electric pulse, only OTDR signals injected at the first node 23 will be amplified. Thereby, ASE signals can be avoided during time periods when there are no optical pulses injected at the first node 23 of the optical fibre 21, which in the art have been known to cause failures and errors when ODTR measurements are performed.

Moreover, the device 20 comprises a second optical circulator 29 arranged to receive the amplified optical pulse from the optical amplifier 28 at a first port and output the amplified optical pulse at a second port connected to a second node 30 of the optical fibre 21, thereby transporting the optical pulse towards the ONUs. Subsequently, the second optical circulator 29 receives, at its second port, an optical signal reflected back from the optical fibre 21 via the second node 30 and outputs the reflected optical signal at a third port via a path 31 bypassing the optical amplifier 28 to a first port of the first optical circulator 27, wherein the reflected optical signal is output from the second port of the first circulator 27 to the first node 23 of the optical fibre 21. Thus, by analysing the reflected optical signal received at the first node 23, it is possible to determine status of the monitored optical fibre 21.

With reference to FIG. 2, it should be noted that while the delay element 26 is illustrated as being embodied as a separate element in the device 20, it could alternatively be integrated with other components, such as the first circulator 27, or even as an input stage in the optical amplifier 28. If the delay element 26 is embodied as a separate element, it could be arranged before the first circulator 27 or alternatively after the first circulator 27 but before the optical amplifier 28.

Figure 3:
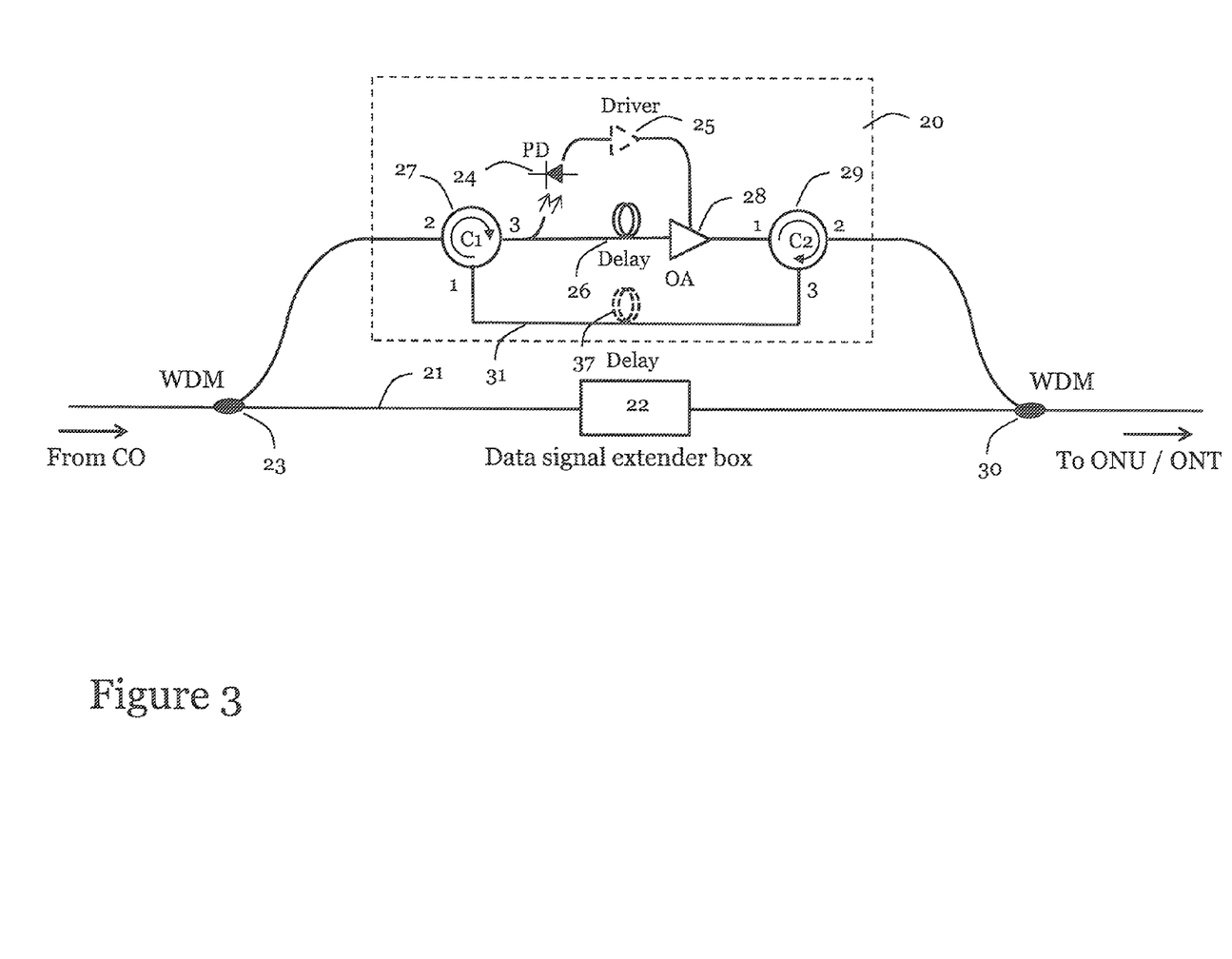
FIG. 3 shows a device for monitoring an optical fibre according to another embodiment of the present invention, where the optical amplifier arrangement comprises an optical amplifier only.

FIG. 3 illustrates a device 20 according to an alternative embodiment of the present invention. In this alternative embodiment, the first circulator 27 is arranged earlier in the signal path (i.e. closer to the first node 23), before the optical signal is passed to the photodetector 24 and before the delay element 26, in which case an additional delay element 37 causing an equal delay optionally could be inserted in the path 31 in order to avoid dead zones in OTDR trace. These dead zones arise because the optical path for forward travelling light is different than the optical path for backwards travelling light. The functionality of the device according to this alternative embodiment is the same as the embodiment illustrated with reference to FIG. 2.

Figure 4:
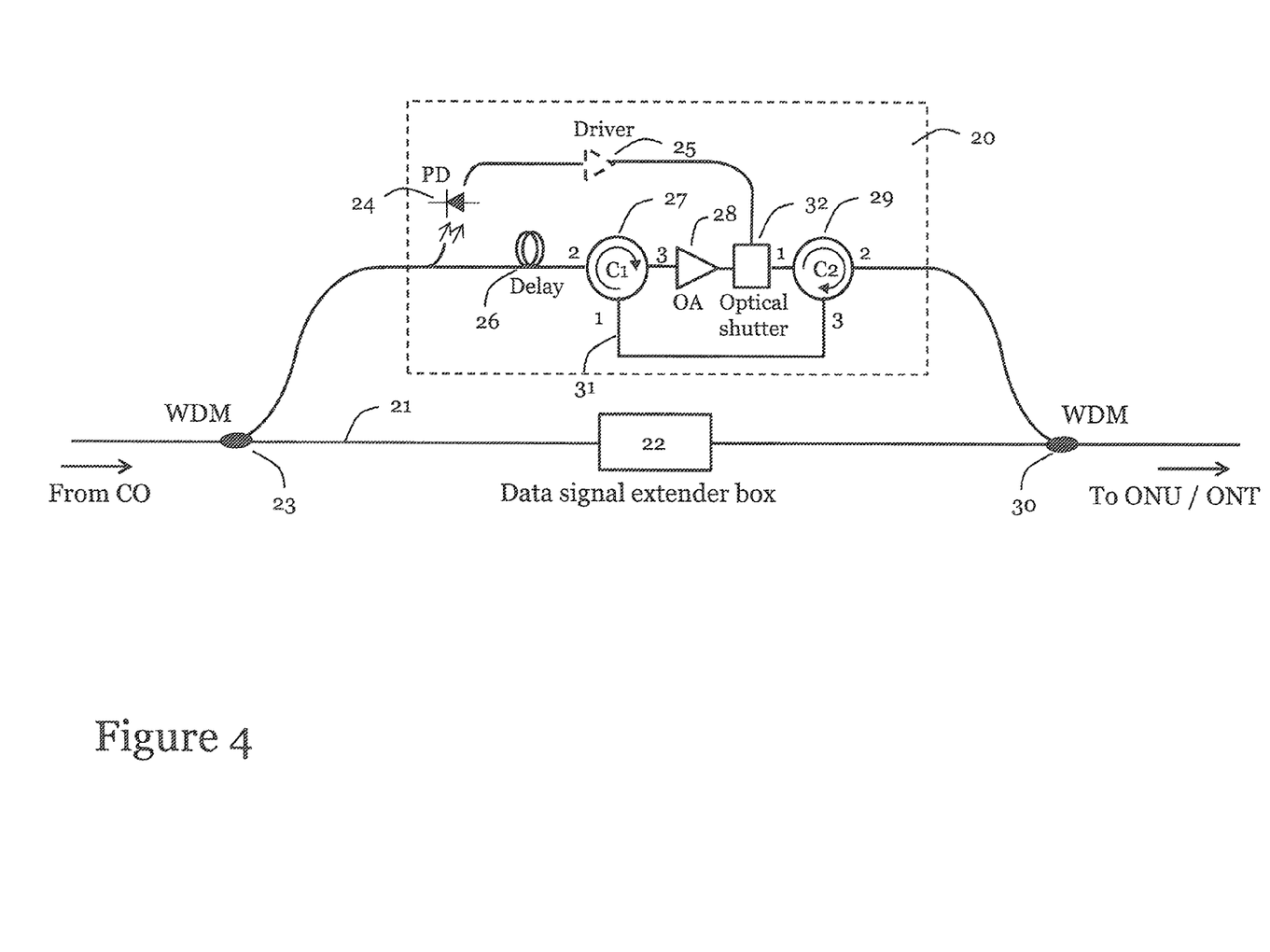
FIG. 4 shows a device for monitoring an optical fibre according to an embodiment of the present invention, where the optical amplifier arrangement comprises an optical amplifier and an optical shutter.

FIG. 4 shows a further embodiment of a device 20 for monitoring an optical fibre 21 according to the present invention. Again, OTDR signals (i.e. optical pulses) to be transmitted to the device 20 for monitoring the optical fibre are separated from data signals to be transmitted to the ONUs at a first node 23 of the optical fibre. Similar to the embodiment described with reference to FIG. 2, a photodetector 24 detects the optical pulse injected at the first node 23 and produces a corresponding electric pulse at its output. Optionally, a driver circuit 25 may be used to amplify and/or adequately format the electric pulse output from the photodetector 24. Further, a delay element 26 is arranged to delay the optical pulse injected at the first node 23 of the optical fibre 21. Subsequently, the delayed optical pulse is input to a second port of a first optical circulator 27 and output at a third port of the first optical circulator 27.

The device 20 further comprises an optical amplifier arrangement in the form of an optical amplifier 28 arranged to receive the delayed optical pulse at its input and an optical shutter or switch 32 arranged to receive the amplified optical pulse from the optical amplifier 28 and the electric pulse produced by the photodetector 24 as an operating signal. The delay element 26 is arranged such that the delayed optical pulse supplied to the optical shutter 32 is synchronized with the produced electric pulse supplied to the optical shutter 32 from the photodetector 24 as an operating signal for outputting an amplified optical pulse from the optical amplifier arrangement. The synchronization is required since the time of travel of the produced electric pulse is different from, and may be substantially greater than, that of the optical pulse passing through the first circulator 27 and the optical amplifier 28, mainly due to the optic-electric conversion at the photodetetector 24. In this particular embodiment, the operating signal is a control signal to the optical shutter 32 for selectively opening and closing a light path through the shutter, i.e. the optical shutter will only transmit an optical pulse supplied to it at its input as long as the control signal is applied. Thus, with this synchronization of the delayed optical pulse and the produced electric pulse, only OTDR signals injected at the first node 23 will be amplified. Thereby, ASE signals can be avoided during time periods when there are no optical pulses injected at the first node 23 of the optical fibre 21, which in the art have been known to cause failures and errors when ODTR measurements are performed.

Moreover, the device 20 comprises a second optical circulator 29 arranged to receive the amplified optical pulse from the optical shutter 32 at a first port and output the amplified optical pulse at a second port connected to a second node 30 of the optical fibre 21, thereby transporting the optical pulse towards the ONUs. Further similar to the embodiment described with reference to FIG. 2, the second optical circulator 29 subsequently receives, at its second port, an optical signal reflected back from the optical fibre 21 via the second node 30 and outputs the reflected optical signal at a third port via a path 31 bypassing the optical amplifier arrangement comprising the optical amplifier 28 and the optical shutter 32 to a first port of the first optical circulator 27, wherein the reflected optical signal is output from the second port of the first circulator 27 to the first node 23 of the optical fibre 21. Thus, by analysing the reflected optical signal received at the first node 23, it is possible to determine status of the monitored optical fibre 21.

Figure 5:
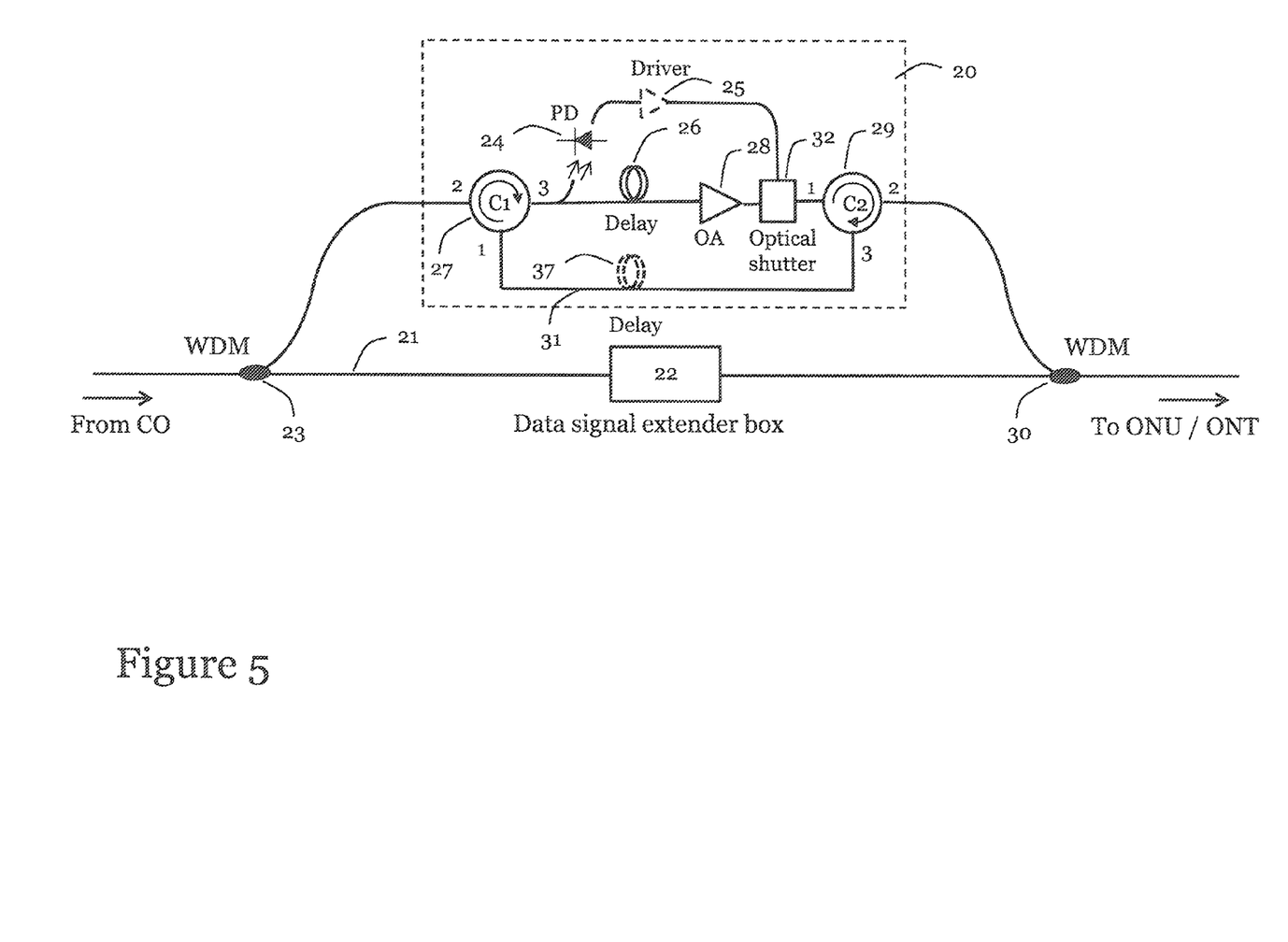
FIG. 5 shows a device for monitoring an optical fibre according to another embodiment of the present invention, where the optical amplifier arrangement comprises an optical amplifier and an optical shutter.

The embodiment of FIG. 5 shows a device 20 according to an alternative embodiment with respect to that shown in FIG.

4. In this alternative embodiment, the first circulator 27 is arranged earlier in the signal path (i.e. closer to the first node 23), before the optical signal is passed to the photodetector 24 and before the delay element 26, in which case an additional delay element 37 causing an equal delay optionally could be inserted in the path 31 in order to avoid dead zones in the OTDR trace. The functionality of the device according to this alternative embodiment is the same as the embodiment illustrated with reference to FIG. 5.

Figure 6:
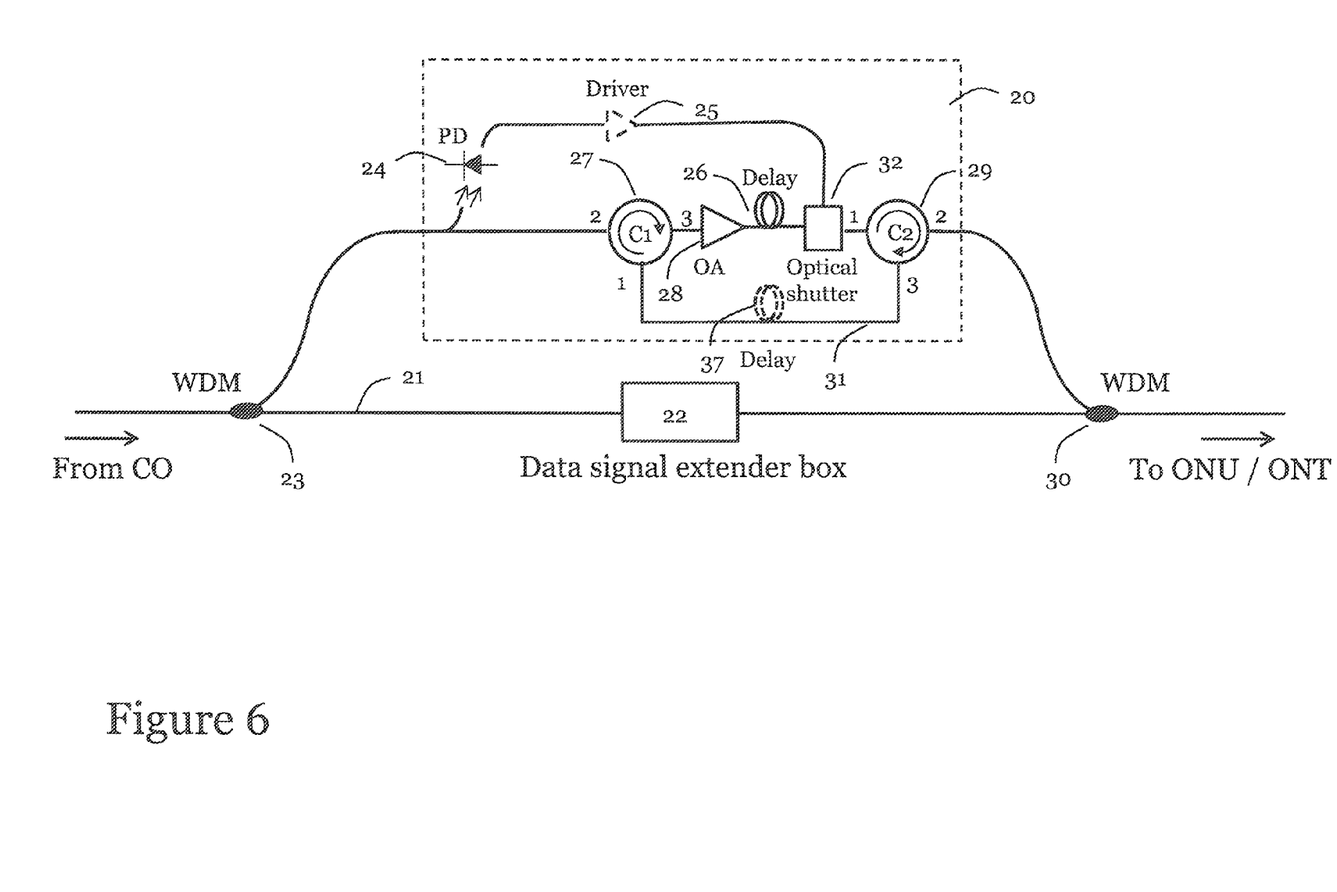
FIG. 6 shows a device for monitoring an optical fibre according to yet an embodiment of the present invention, where the optical amplifier arrangement comprises an optical amplifier and an optical shutter.

In embodiments where the optical amplifier arrangement comprises an optical amplifier 28 and an optical shutter 32, the delay element 26 could alternatively be arranged between the optical amplifier 28 and the optical shutter, as illustrated in FIG. 6, in which case an additional delay element 37 causing an equal delay optionally could be inserted in the path 31 in order to avoid dead zones in the OTDR trace. Thus, the optical amplifier 28 receives the optical pulse at its input and amplifies it, after which the delay element 26 appropriately delays the amplified optical pulse. The optical shutter 32 subsequently receives the amplified and delayed optical pulse and the electric pulse produced by the photodetector 24 as a control signal. The optical pulse supplied to the optical shutter 32 is hence synchronized with the produced electric pulse supplied to the optical shutter 32 from the photodetector 24, such that only the optical pulse is transmitted through the shutter, wherein signals or noise appearing outside the duration of the optical pulse is prevented from subsequently being transmitted by the device 20. Hence, only OTDR signals injected at the first node 23 will be amplified.

Figure 7:
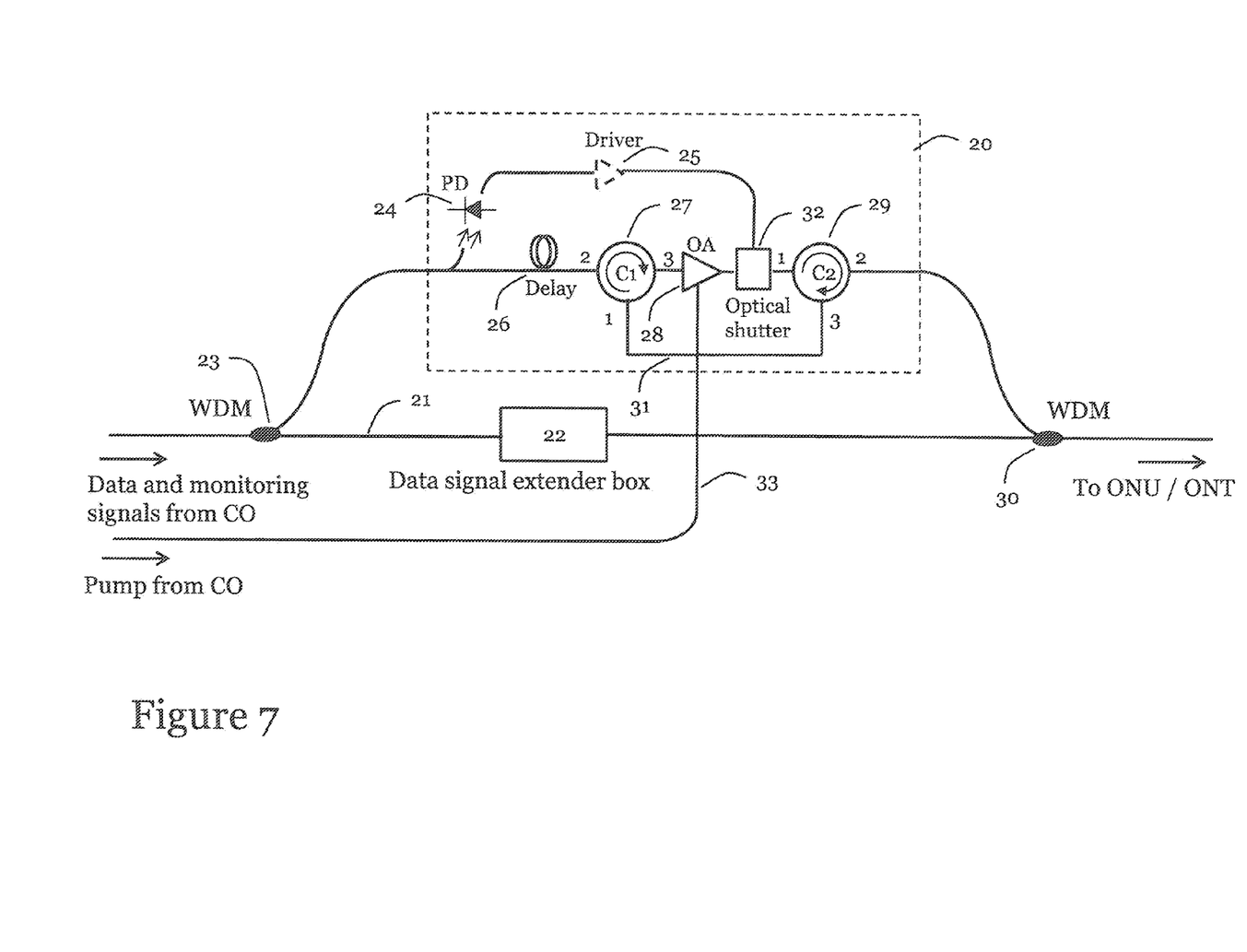
FIG. 7 shows a device for monitoring an optical fibre according to an embodiment of the present invention, where the optical amplifier is pumped from a remote location.

FIG. 7 illustrates a device 20 in accordance with a further embodiment of the present invention. The device 20 is the same as that shown in FIG. 4, but in this particular embodiment, the optical amplifier 28 is remotely pumped by laser light submitted from the CO via a pumping optical fibre 33. Thus, in this particular embodiment, there is no need to pump the optical amplifier 28 locally at the device 20, which is advantageous since local pumping requires powering.

Further, various components included in the device 20 for monitoring a fibre cable need powering. Since the device 20 may be located in the field where possibilities of providing local power supply are scarce, it may be desirable to transport power to the device 20 from a remote supply.

Figure 8:
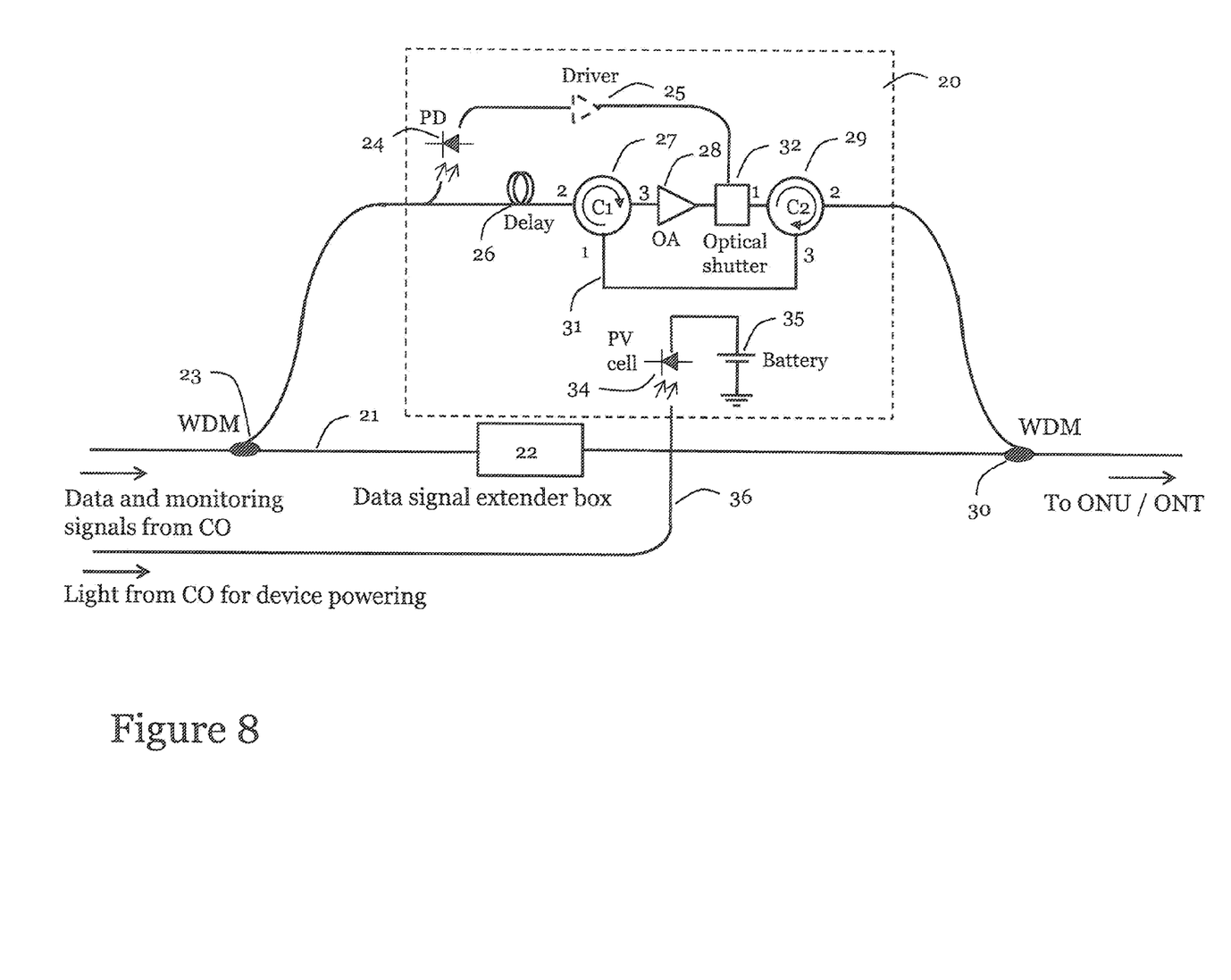
FIG. 8 shows a device for monitoring an optical fibre according to an embodiment of the present invention, where the device is powered from a remote location.

FIG. 8 illustrates a device 20 in accordance with still another embodiment of the present invention. The device 20 is the same as that shown in FIG. 4, but in this particular embodiment, the device 20 is arranged with a photovoltaic (PV) cell 34, e.g. a photodetector, and a rechargeable battery 35 from which the device 20 is powered. The PV cell 34 is supplied with light via a powering optical fibre 36, converts the light to an electric signal and supplies the rechargeable battery 35 with the electric signal such that the battery 35 in its turn can supply components and circuitry of the device 20 with required power. Thus, in case the device 20 is located in the field where possibilities of providing local power supply are scarce, the device can be remotely powered via the powering optical fibre 36 from the CO. Since a PV cell 34 is used, an alternative to optical fibre powering would be sunlight. However, optical fibre powering is further advantageous in case embedded installations are used where no sunlight can reach the PV cell 34.

It should be noted that the powering optical fibre 36 of FIG. 8 and the pumping optical fibre in an embodiment of the present invention could be the same optical fibre, i.e. the optical amplifier 32 and the PV cell 34 is supplied with laser light from the same optical fibre thus being a combined laser pumping and powering optical fibre.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A device for monitoring an optical fibre comprising:
   a photo-sensitive device arranged to produce an electric pulse from an optical pulse injected at a first node of the optical fibre;
   a delay element and a first optical circulator arranged to delay the optical pulse injected at the first node of the optical fibre, wherein the optical pulse is input to a second port of the first optical circulator and output at a third port of the first optical circulator;
   an optical amplifier arrangement arranged to receive the optical pulse at its input and the produced electric pulse as an operating signal, wherein the delay element is arranged to delay the optical pulse such that the delayed optical pulse is synchronized with the produced electric pulse supplied to the optical amplifier arrangement as an operating signal, for producing an amplified optical pulse;
   a second optical circulator arranged to receive the amplified optical pulse at a first port and output the amplified optical pulse at a second port connected to a second node of the optical fibre, said second optical circulator further being arranged to receive an optical signal reflected back from the optical fibre at the second port and outputting the reflected optical signal at a third port via a path bypassing the optical amplifier arrangement to a first port of the first optical circulator, wherein the reflected optical signal is output from the second port of the first circulator to the first node of the optical fibre.

2. The device of claim 1, further comprising:
   a driver arranged to amplify and/or format the electric pulse output from the photo-sensitive device to be supplied to the optical amplifier arrangement.

3. The device of claim 1, said delay element being arranged at the second port of the first optical circulator.

4. The device of claim 1, said delay element being arranged at the third port of the first optical circulator.

5. The device of claim 1, said photo-sensitive device (24) being arranged at the first node of the optical fibre to be monitored.

6. The device of claim 1, said photo-sensitive device being arranged at the third port of the first optical circulator.

7. The device of claim 1, said optical amplifier arrangement comprising an optical amplifier, wherein said operating signal is an optical amplifier drive signal.

8. The device of claim 1, said optical amplifier arrangement comprising an optical amplifier and an optical shutter, said optical shutter receiving the optical pulse amplified by the optical amplifier, wherein said operating signal is a control signal to the optical shutter for selectively opening and closing a light path through the optical shutter.

9. The device of claim 8, said delay element being arranged between the optical amplifier and the optical shutter.

10. The device of claim 3, further comprising:
    an additional delay element arranged in said path for delaying the reflected optical signal.

11. The device of claim 1, said optical amplifier being arranged to be laser pumped by an external pumping optical fibre.

12. The device of claim 11, further being arranged such that the external pumping optical fibre extends to a remote location where a light source is used to pump the optical amplifier via said pumping optical fibre.

13. The device of claim 11, further comprising:
a photovoltaic cell arranged to produce an electric signal from an optical signal supplied via a powering optical fibre; and
a rechargeable battery arranged to be charged by the electric signal supplied by the photovoltaic cell for powering the device.

14. The device of claim 13, further being arranged such that the powering optical fibre extends to a remote location where the optical signal is applied to said powering optical fibre.

* * * * *